June 13, 1950 — J. T. LEONARD — 2,511,779
LUBRICATING APPARATUS
Filed Oct. 4, 1944 — 13 Sheets-Sheet 3

Inventor:
John T. Leonard
By Williams, Bradbury & Hinkle
Attorneys

June 13, 1950   J. T. LEONARD   2,511,779
LUBRICATING APPARATUS

Filed Oct. 4, 1944   13 Sheets-Sheet 5

Inventor:
John T. Leonard
By Williams, Bradbury & Hinkle
Attorneys

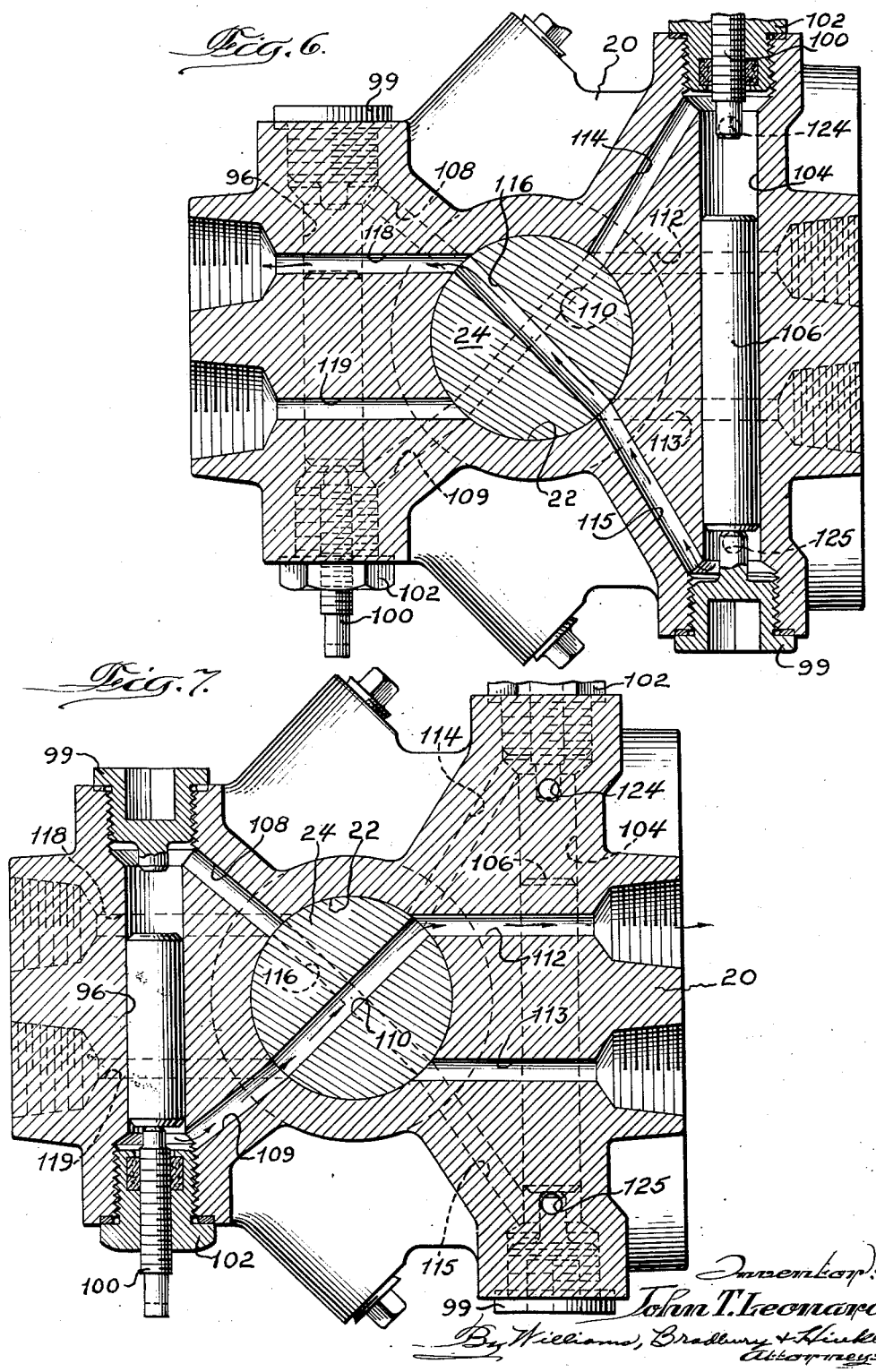

June 13, 1950 J. T. LEONARD 2,511,779
LUBRICATING APPARATUS
Filed Oct. 4, 1944 13 Sheets-Sheet 7

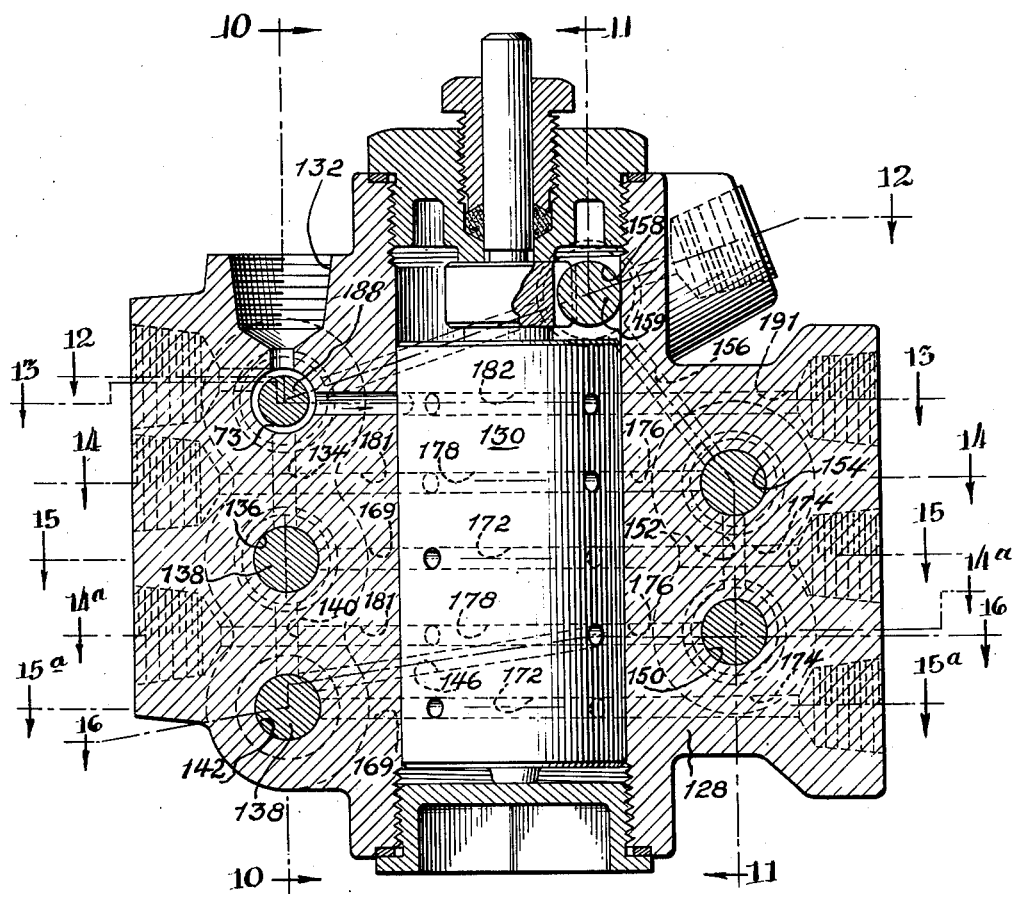

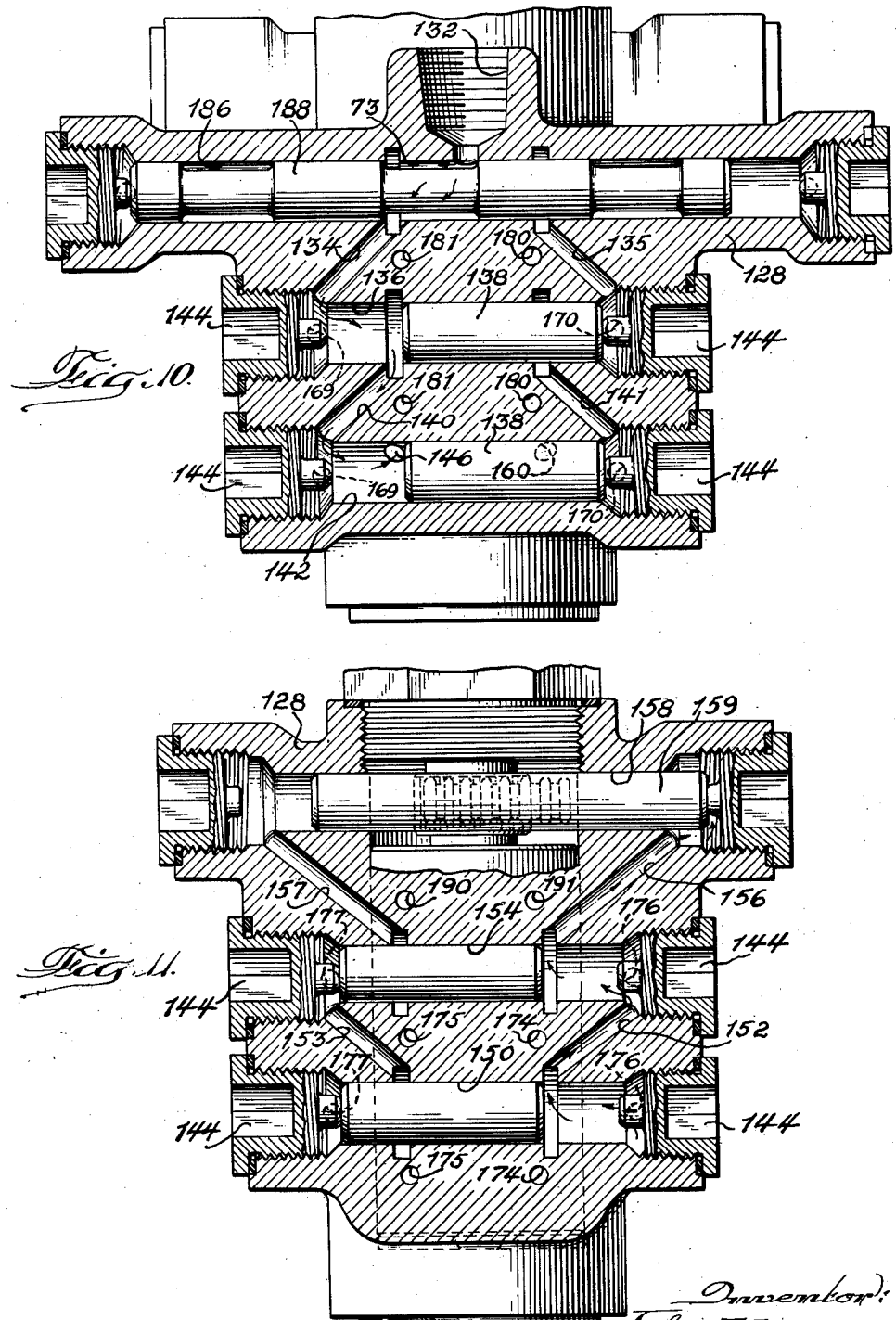

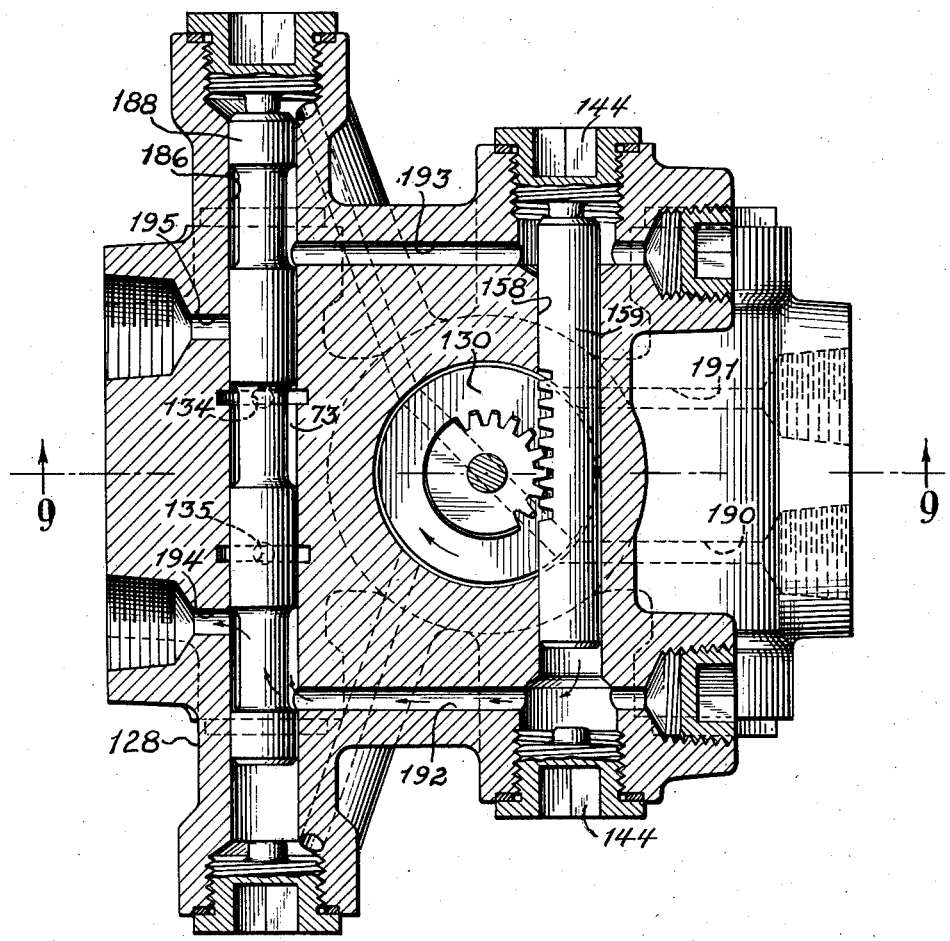

June 13, 1950     J. T. LEONARD     2,511,779
LUBRICATING APPARATUS

Filed Oct. 4, 1944     13 Sheets-Sheet 11

Inventor:
John T. Leonard
By Williams, Bradbury & Hinkle
Attorneys.

June 13, 1950  J. T. LEONARD  2,511,779
LUBRICATING APPARATUS
Filed Oct. 4, 1944  13 Sheets-Sheet 12

Inventor:
John T. Leonard
By Williams, Bradbury & Hinkle
Attorneys

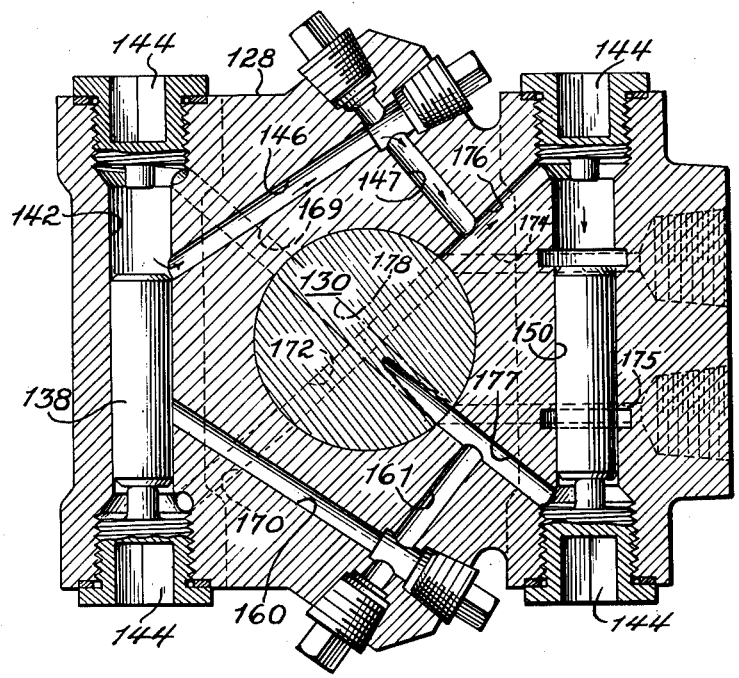

Patented June 13, 1950

2,511,779

UNITED STATES PATENT OFFICE 2,511,779

LUBRICATING APPARATUS

John T. Leonard, Evanston, Ill.

Application October 4, 1944, Serial No. 557,136

13 Claims. (Cl. 184—7)

My invention relates generally to lubricating apparatus and more particularly to centralized lubricating systems whereby a plurality of distributed bearings may be expeditiously lubricated from a central control station.

It is an object of my invention to provide a simplified central lubricating system for supplying measured charges of lubricant to a plurality of distributed bearings.

A further object is to provide an improved central control valve for controlling the distribution of measured charges of lubricant to a plurality of parts requiring lubrication.

A further object is to provide an improved lubricating system of the above mentioned type, in which the measured charges of lubricant supplied to the various bearings may be individually varied to suit the requirements of each particular installation.

A further object is to provide an improved centralized lubricating system employing a central distributing valve which incorporates means for measuring the charges of lubricant supplied to the bearings.

A further object is to provide an improved distributing and charge measuring valve structure which is operated by the application of lubricant pressure thereto.

Other objects will appear from the following description, reference being had to the accompanying drawings, in which:

Fig. 1 is a longitudinal sectional view of the control valve, taken on the broken line 1—1 of Fig. 4;

Figs. 2 and 3 are vertical sectional views taken on the lines 2—2 and 3—3, respectively, of Fig. 1;

Figs. 4 and 5 are transverse sectional views taken on the lines 4—4 and 5—5, respectively, of Fig. 1;

Fig. 6 is a transverse sectional view taken on the line 6—6 of Fig. 1, and corresponds exactly with the section taken on the line 6a—6a, and substantially with the section taken on the line 6b—6b;

Fig. 7 is a transverse sectional view taken on the line 7—7 of Fig. 1, and is substantially identical with the sections taken on the lines 7a—7a and 7b—7b, respectively;

Fig. 9 is a longitudinal sectional view of a modified form of the control valve, taken through the center thereof;

Fig. 10 is a vertical sectional view taken on the line 10—10 of Fig. 9;

Fig. 11 is a longitudinal sectional view taken on the irregular line 11—11 of Fig. 9;

Fig. 12 is a transverse sectional view taken on the irregular line 12—12 of Fig. 9;

Figure 15:
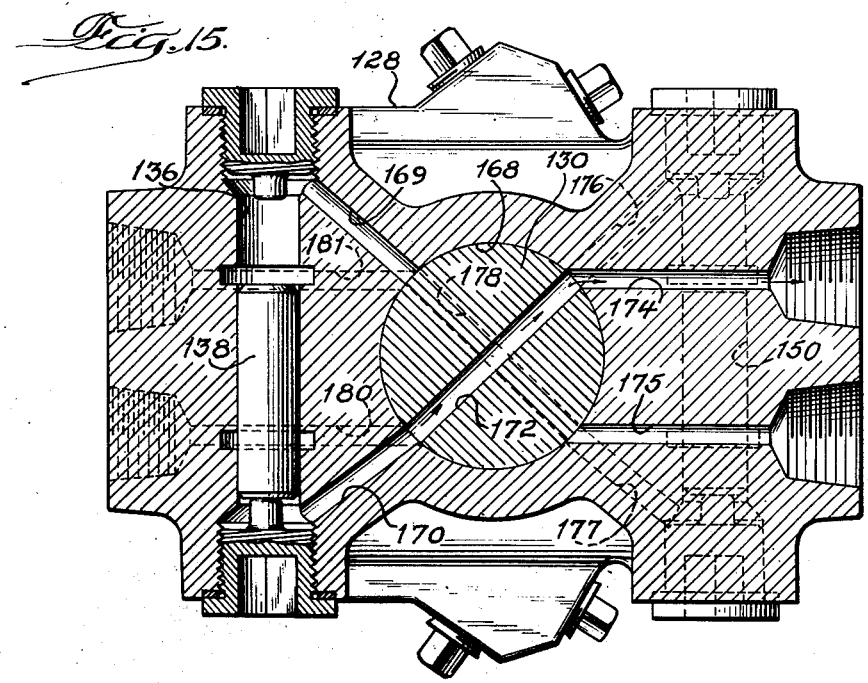

Fig. 15 is a transverse sectional view taken on the line 15—15 of Fig. 9, and is identical with a section taken on the line 15a—15a of Fig. 9; and Fig. 16 is a transverse sectional view taken on the irregular line 16—16 of Fig. 9.

In general, this application discloses two similar forms of the invention, in one of which, shown in Figs. 1 to 8, the measuring of the charges of lubricant supplied to the bearings is accomplished by the so-called manifold system in which all of the charge measuring devices operate substantially simultaneously, whereas in the other embodiment of the invention, shown in Figs. 9 to 16, the charges of lubricant are supplied to the bearings sequentially by the charge measuring device, this latter system being usually referred to as a progressive system. In other respects the two embodiments of the invention are similar.

Referring to the embodiment shown in Figs. 1 to 9, there is provided a body casting 20 having a generally central bore 22 therein for the reception of a plug valve 24. The plug valve may be lapped in place and is held in position between a hollow plug 26 and a bushing 28, the latter bearing against the end face of a mutilated gear portion 30. Beyond the mutilated gear portion 30 is a small diameter pin-like extension 32 which projects through the bushing 28 and a packing gland 33 which is threaded in said bushing. A position indicator arm may be attached to the end of the extension 32, or a suitable mechanical connection may be made between this shaft and a counter or other register indicating the number of times that the apparatus has been operated. The plugs 26 and 28 are provided with suitable gaskets so as to seal the ends of the bore 22.

A plunger 34 having a rack portion 36 (Fig. 4) is reciprocable in a transverse bore 38 formed in the body casting 20, the rack portion 36 meshing with the teeth of mutilated gear 30. This plunger 34 forms the means for rotating the plug valve 24. The plunger 34 is reciprocated by the application and release of lubricant pressure upon the opposite ends thereof.

Figure 4:
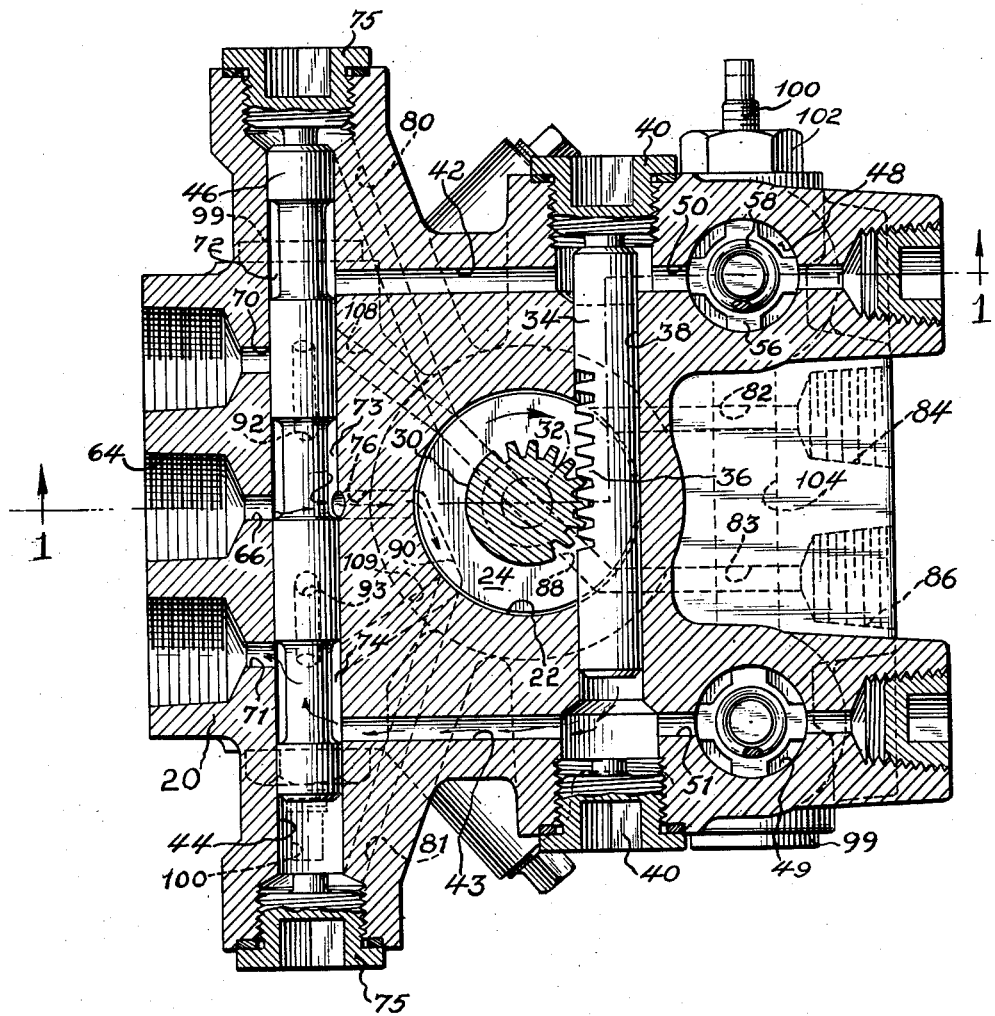
Figure 5:
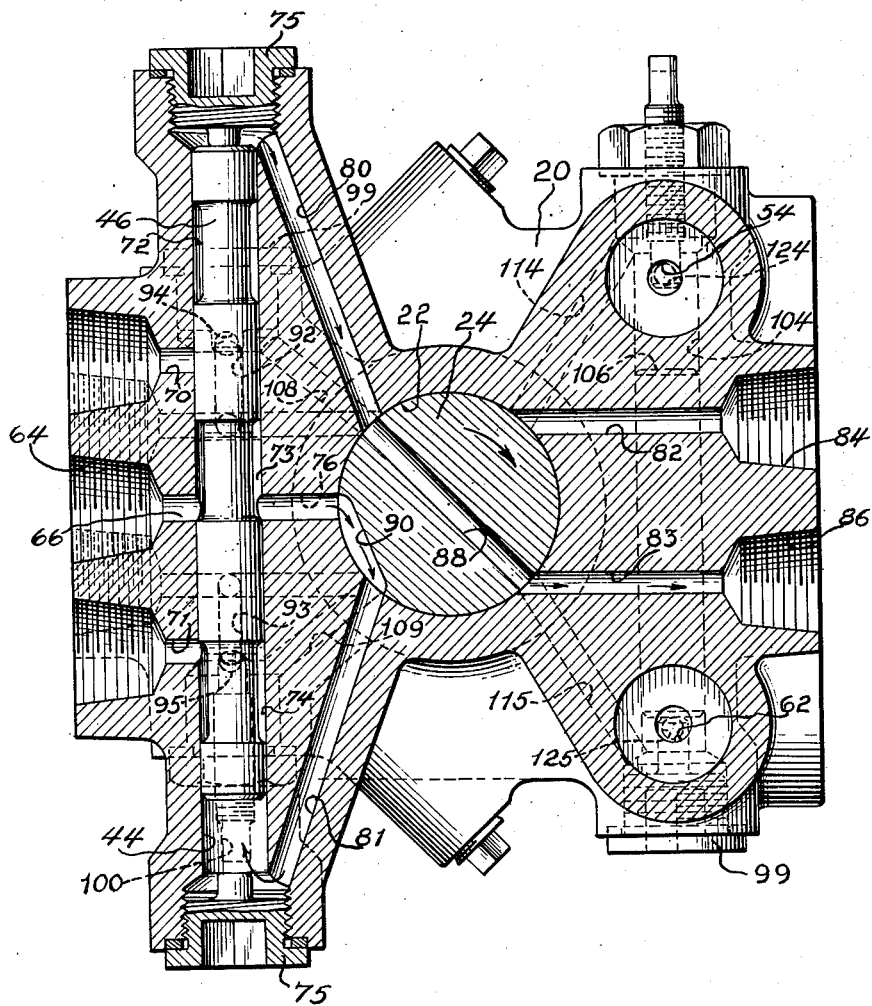

As best shown in Fig. 4, the opposite ends of the bore 38 are closed by plugs 40 and communicate through passageways 42, 43 with a bore 44 in which a multi-groove spool valve 46 is freely reciprocable. The ends of the bore 44 are suitably plugged. The ends of bore 38 also communicate with valve chambers 48, 49 through passageways 50, 51, respectively. Within the valve chamber 48 is located a ball valve 52 (Fig. 1) capable of closing the end of a pasageway 54, the ball valve being held against the seat by a retainer 56 pressed downwardly by a precompressed coil spring 58, the degree of compression of said spring being adjustable by means of a threaded plug 60 closing the upper end of the valve chamber 48. A similarly constructed check valve 59 is located in the valve chamber 49 and is adapted to close the end of a passageway 62 (Fig. 5).

Lubricant is adapted to be supplied to the control valve from any suitable controlled source of lubricant under pressure connected to an inlet opening 64 (Figs. 1, 4, and 5) through a port 66. Lubricant is adapted to be discharged to bearings, as will appear hereinafter, through ports 70 and 71 which lead into the bore 44.

The spool valve 46 is provided with three peripheral grooves 72, 73, and 74. It will be noted that the reciprocation of the spool valve 46 is limited by plugs 75 to an extent such that the groove 72 thereof is always in communication with passageway 42, the groove 73 thereof always in communication with the passageway 66, and the groove 74 thereof always in communication with passageway 43. The groove 73 is also in communication with a passageway 76 at all times.

The ends of the bore 44 have passageways 80 and 81 connected thereto respectively. As shown in Fig. 5, there are a pair of passageways 82, 83 which lead from the bore 22 of the plug valve to bearings to be lubricated, the bearings being connected to these passageways by suitable conduits threaded in tapped holes 84, 86, respectively.

As best shown in Fig. 5, the plug valve 24 has a diametral passageway 88 which is adapted to connect pasageways 80 and 83, which in the position shown in Fig. 5, connects passageways 80 and 83, but which, when the plug valve 24 is rotated clockwise through an angle of approximately 90° is adapted to connect passageways 81 and 82. When in the position shown, a passageway 90 formed in the plug valve connects passageways 76 and 81, and when the plug valve is rotated clockwise through 90°, this passageway 90 connects passageway 76 and 80.

Figure 2:
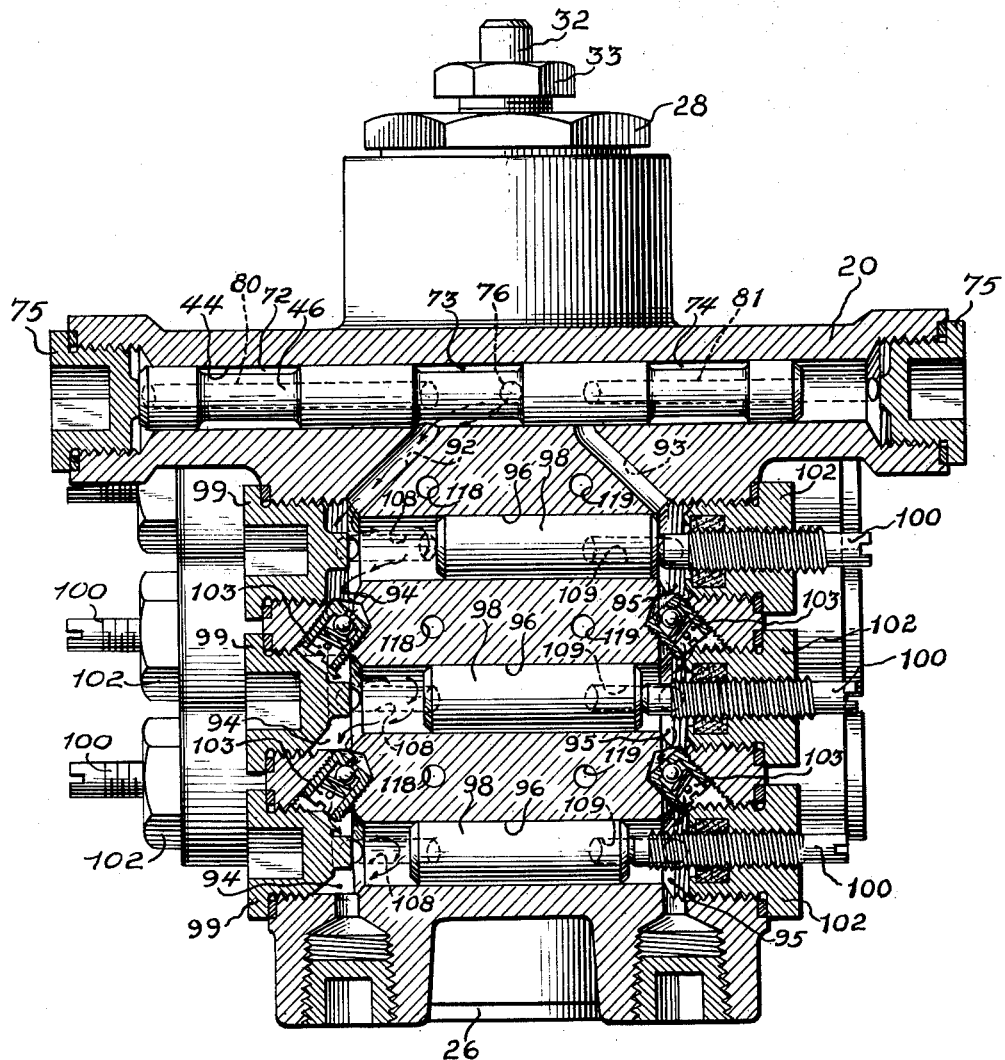

As best shown in dotted lines in Fig. 4 and in full lines in Fig. 2, there is a passageway 92 adapted to communicate with the annular groove 73 when the spool valve 46 is in the position shown in Fig. 4. Similarly, a passageway 93 is adapted to communicate with the groove 73 when the spool valve 74 is in its opposite extreme position. As shown in Fig. 2, the passageway 92 communicates with a check valved manifold passageway 94 extending vertically through the body casting 20, while the passageway 93 communicates with a similar manifold passageway 95. Intersecting and extending between the manifold passageways 94 and 95, are a plurality of cylinders 96 illustrated as being three in number, but the number of which could be increased to any extent required for a particular lubricating installation. Within each of the cylinders 96 is a measuring plunger or piston 98, the stroke of which is limited at one end by a plug 99 and at the other end by an adjusting screw 100 threaded in a plug 102, which is provided with suitable packing to prevent lubricant from leaking past the adjusting screw 100. It will be clear that by varying the adjustment of the screws 100 the strokes of the plunger 98 may be varied as desired to cause them to discharge different quantities of lubricant.

Spring loaded check valve plugs 103 are located in the manifold passageways 94 and 95 between each pair of adjacent cylinders 96. These check valves offer substantial resistance to lubricant flow, in the order of 100 to 150 p. s. i.

A similar battery of cylinders 104 (Fig. 3) are formed in the body casting 20 on the diametrically opposite side of the plug valve 24, each of these cylinders being provided with a plunger 106, the strokes of these plungers being adjustably limited in the same manner as are the plungers 98.

As best shown in Fig. 7, the ends of the cylinder 96 have passageways 108, 109 respectively connecting therewith, these passageways terminating in the bore 22 of the plug valve 24. The plug valve is provided with a plurality of diametral passageways 110, which, when the plug valve is in the position shown in Fig. 7, connect the passageways 109 with passageways 112 leading to bearings to be lubricated, while when the plug valve is rotated approximately 90° clockwise from the position shown in Fig. 7, the passageways 110 connect the passageways 108 and 113, the latter also leading to bearings requiring lubrication.

Similarly, passageways 114 and 115 are connected respectively to the opposite ends of the cylinders 104 and lead to the plug valve bore 22. Diametral passageways 116, when the plug valve is in the position shown in Fig. 6, connect passageways 115 and 118, while when the plug valve is rotated through 90° from the position shown in Fig. 6, these passageways 116 connect passageways 114 and 119, the passageways 118 and 119 being suitably connected to individual parts to be lubricated.

Figure 1:
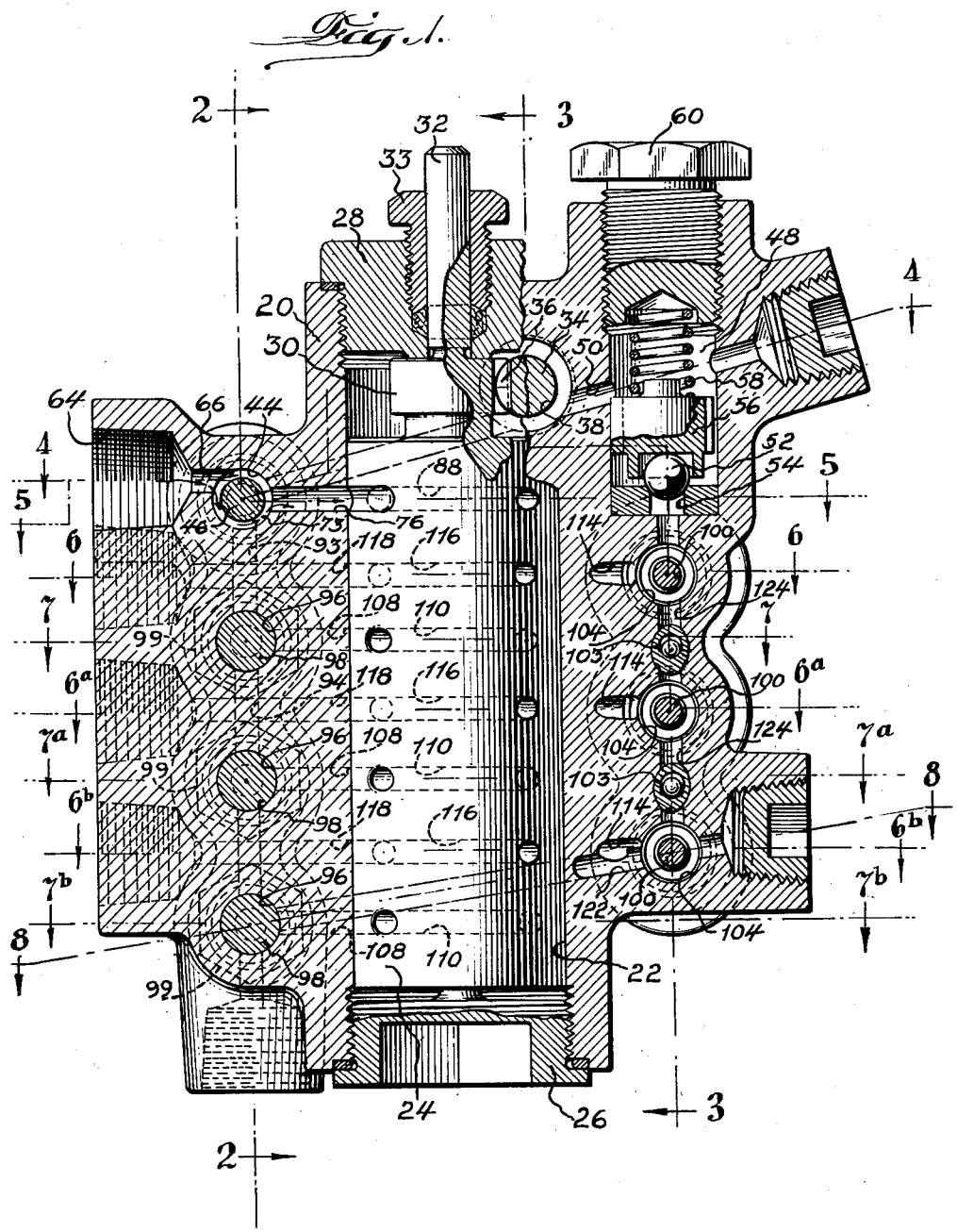
Figure 3:
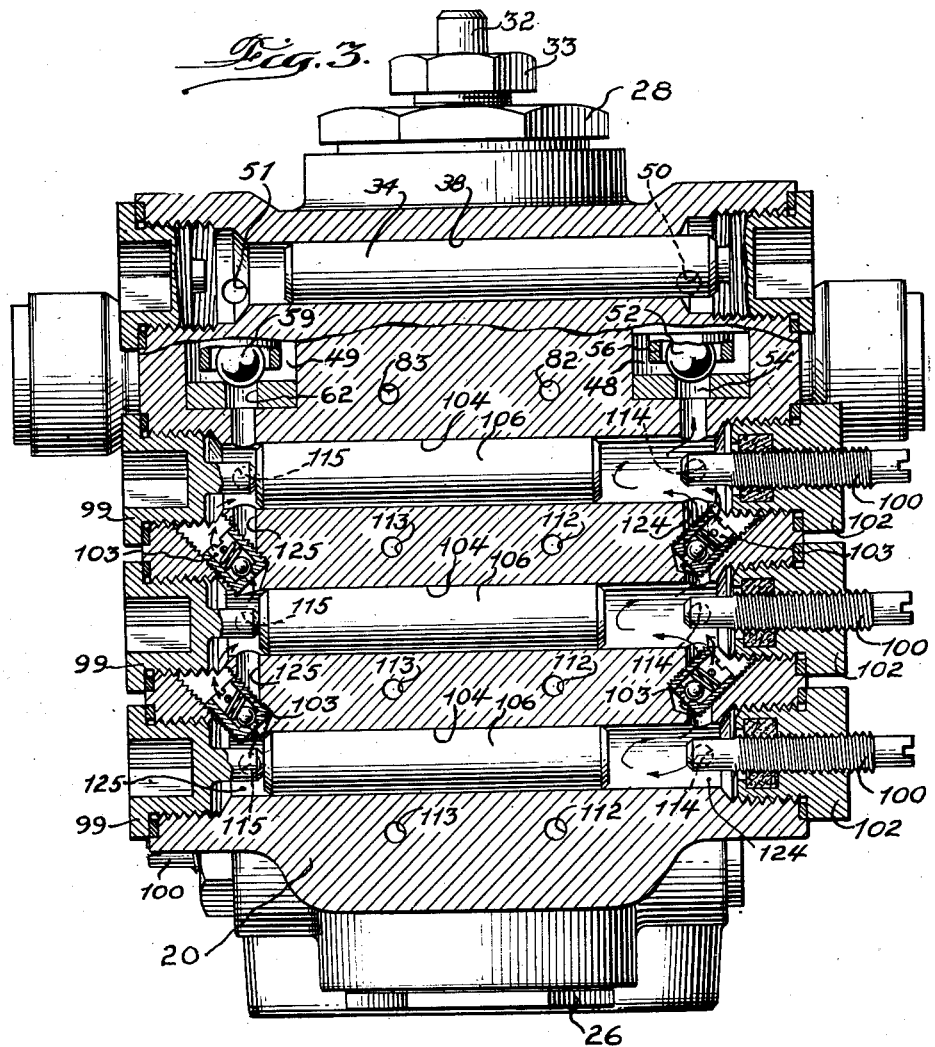
Figure 8:
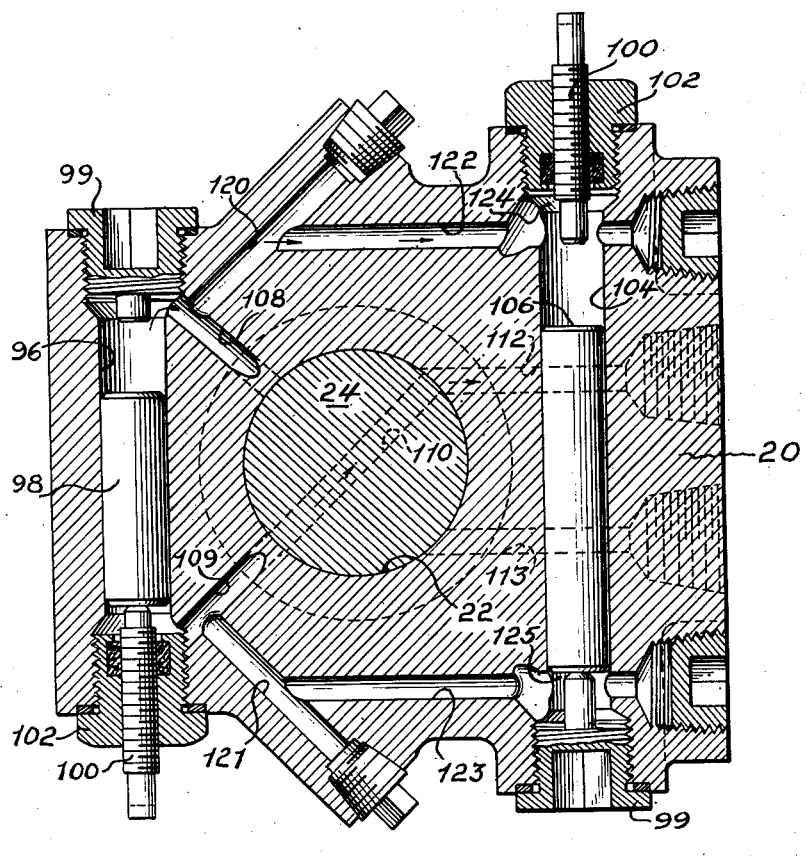
Fig. 8 is a transverse sectional view taken on the line 8—8 of Fig. 1.

As shown in Fig. 8, the passageways 108 and 109, connected to the ends of the lowermost cylinder 96, have passageways 120 and 121 respectively communicating therewith, the latter passageways communicating respectively through passageways 122 and 123 with manifold passageways 124 and 125 respectively (Fig. 3). The merging of the passageways 122, passageway 114, and the manifold passageway 124, is shown in Fig. 1.

Assuming that the various cylinders and passageways are filled with a lubricant such as grease, and that the inlet opening 64 (Fig. 5) is connected to a suitable source of lubricant under pressure, in the order of 2000 p. s. i., lubricant will flow through the inlet opening 66 and through the passageway 92 to the manifold 94 (Fig. 2), forcing the plunger 98 to the right and ejecting the lubricant from the right-hand (Fig. 2) end of the cylinder 96, through the passageways 109, 110, and 112 (Fig. 7), to one of the parts to be lubricated. Lubricant will flow in the path just described in preference to flowing downwardly through the manifold 95, since the loaded check valve plug 103 near the right-hand end of the uppermost cylinder 96 will afford substantial resistance to flow of lubricant.

After the uppermost plunger 98 has been moved to the right to force its measured charge of lubricant to its associated bearing, lubricant will flow downwardly through the manifold 94 past the loaded check valve 103, into the left-hand end of the second cylinder 96, forcing the plunger 98 therein to the right and forcing a charge of lubricant, measured by the adjustment of the adjusting screw 100, to its associated bearing. Thereafter the lowermost plunger 98 will be operated in a similar manner. After the latter has operated, lubricant under pressure will flow from the left-hand end of the lowermost cylinder 96, through the passageways 108 (Fig. 8), 120, and 122, to the lower end of the manifold 124 (Fig. 3). Lubricant flowing to the lowermost cylinder 104 will force its plunger 106 to the left (Fig. 3), discharging the lubricant from the left end of this cylinder 104 through passageways 115 (Fig. 6), 116, and 118, to a part to be lubricated. When the plunger 106 reaches the end of its stroke, lubricant pressure will build up sufficiently to flow past the check valve plug 103 and into the intermediate cylinder 104, forcing its plunger 106 to the left (Fig. 3). Thereafter lubricant will flow upwardly through the manifold 124, past the next valve plug 103 into the uppermost cylinder 104, forcing its plunger to the left and discharging lubricant to its associated bearing.

The foregoing completes one-half cycle of operation of the apparatus. As the lubricant pressure builds up in the right-hand end of the uppermost cylinder 104 (Fig. 3), it will unseat spring loaded check valve 52 and flow into the valve chamber 48, and hence through passageway 50 into the end of the bore 38 (Fig. 4), thereby forcing the rack plunger 34 to the opposite end of its stroke, and thus rotating valve plug 24 clockwise through an angle of approximately 90°. As the rack plunger 34 is thus operated, lubricant is discharged from the opposite end of the bore 38, passageway 43, around spool valve groove 74, through port 71, to a bearing to be supplied with lubricant.

Rotation of the plug 24 causes the passageway 90 to connect the passageways 76 and 80 (Fig. 5), thereby causing flow of lubricant to the (upper, Fig. 5) end of the spool valve, moving the latter to the opposite end of its stroke. When in the latter position, the annular groove 73 of the spool valve connects the inlet port 66 with the upper end of the passageway 93 (Fig. 2), whereupon lubricant will flow to the right-hand ends of the cylinders 96, thereby successively to force the latter leftward and eject the lubricant through passageways 108, 110, and 113 (Fig. 7), to their associated bearings.

As before, the loaded check valve plugs 103 afford substantial resistance to the flow of lubricant, so that the plungers 98 will operate successively and supply lubricant only to their associated bearings. After all of the plungers 98 have moved to the left (Fig. 2), lubricant will flow through the passageways 109, 121, and 123 (Fig. 8), to the lower end of the manifold 125 (Fig. 3). Thus lubricant will be successively supplied to the left-hand ends of the cylinders 104 to force the plungers 106 to the right, discharging the lubricant through passageways 114, 116, and 119, to their associated bearings.

After all of the plungers 106 have been moved to the right (Fig. 3), lubricant will flow past the loaded ball check valve 59 and through the check valve chamber 49 and passageway 51 (Fig. 4), to the adjacent end of the bore 38. As pressure builds up, the rack plunger 34 will be forced to the opposite end of its stroke (to the position shown in Fig. 4), thereby rotating the plug 24 counterclockwise through an angle of approximately 90°, thereby completing an operating cycle. Completion of this cycle will be noted by the operator by observing the rotation of the stem 32 or the indicator attached thereto.

From the foregoing, it will be clear that the operation of the lubricant measuring and distributing apparatus is entirely automatic, requiring merely that the operator control the flow of lubricant to the inlet port 66. In some installations it may be desirable to have the supply of lubricant to the inlet port 66 controlled by a part of the machine being lubricated, and to provide suitable means to cause discontinuance of the operation of the apparatus after it has completed an operating cycle.

It will be noted that each of the cylinders 96 and 104 provides for lubrication of two bearings, and thus twelve bearings may be supplied with measured charges of lubricant, the amounts of which may be predetermined by the adjustment of the set screws 100. In addition, the lubricant charges displaced by the spool valve 46 and by the rack plunger 34 are also supplied to bearings, so that four additional bearings are supplied with measured charges. The latter four bearings are preferably such for which the amount of lubricant supplied is not critical, since there is no means provided for adjustment of the amounts of the charges supplied to the latter four bearings. A total of sixteen bearings may thus be conveniently lubricated by means of the apparatus disclosed, it being understood, however, that the number of cylinders 96 and 104 might be considerably increased if the apparatus is to be used for the lubrication of a machine having more than sixteen parts requiring regular lubrication.

The embodiment shown in Figs. 9 to 16 is generally similar to that of Figs. 1 to 8, the main differences being in the manner of operation of the measuring plungers, since they can operate only one after another, i. e., in series, or progressively. By virtue of the differences in the manner in which the plunger cylinders and associated passageways are constructed, the separation of the charges among the various parts to be lubricated is positive, and therefore it is not necessary to provide loaded check valves in order to secure proper segregation of the charges of lubricant supplied to individual bearings.

The body 128 of the apparatus is provided with a bore for the plug valve 130, which is similar in general construction to that previously described, and operates in a similar manner. Such parts of the apparatus as are similar in form and function to those previously described will not again be described, and reference characters corresponding to those used in the description of Figs. 1 to 8 have been applied to the corresponding parts of the modified form of the invention shown in Figs. 9 to 16.

Lubricant is supplied to the apparatus from a suitable source of lubricant under pressure, connected to inlet opening 132. Lubricant supplied through the inlet 132 flows past the annular groove 73 of the spool valve 188 (Fig. 10) to a passageway 134 which leads to the left-hand (Fig. 10) end of upper measuring cylinder 136. A plunger 138 is reciprocable in the cylinder 136 and, when in its right-hand position as shown, uncovers the end of a diagonal passageway 140 leading to the left-hand end of a cylinder 142, likewise containing a plunger 138. The strokes of the plungers 138 are limited by plugs 144 threaded in the body 128. Passageways 135 and 141, complementary to the passageways 134 and 140, are adapted, as will hereinafter appear, to conduct lubricant to the right-hand (Fig. 10) ends of the cylinders 136, 142.

Leading from near the left-hand (Fig. 10) portion of the cylinder 142, is a passageway 146 which, as best shown in Fig. 16, connects with passageways 147 and 176 terminating at the right-hand (Fig. 11) end of lowermost cylinder 150. A diagonal passageway 152 connects the cylinder 150 with the right-hand end of cylinder 154, while a similar diagonal passageway end of the rack plunger bore 158. In a similar manner, diagonal passageways 153 and 157 respectively connect the cylinder 150 with the cylinder 154, and connect the latter with the left-hand end of the rack plunger bore 158.

Connected passageways 160, 161, and 177 (Fig. 16) lead from the lowermost cylinder 142 to the left-hand end (Fig. 11) of cylinder 150.

As shown in Fig. 15, one end of the cylinder 136 is connected to the bore 168 of the valve plug 130 by means of a passageway 169, while the other end of said cylinder 136 is provided with a similar passageway 170. The valve plug 130 has a plurality of diametral passageways 172, one of which, as seen in Fig. 15, connects one of the passageways 170 with an outlet passageway 174, which is suitably connected to a part to be lubricated. When the valve plug 130 is moved clockwise through approximately 90°, the diametrical passageway 172 thereof will connect passageway 169 with passageway 175 leading to another of the bearings to be lubricated.

In a similar manner, the opposite ends of the cylinders 150 and 154 have passageways 176 and 177 (Fig. 14) connected thereto, these passageways being adapted to register with diametral passageways 178 in the valve plug 130, and thus connect the passageways 176, 177 with passageways 180 and 181, respectively, depending upon the position of the valve plug 130. The valve plug 130 is also provided with a diametrical passageway 182 and segmental passageway 184 (Fig. 13), which are adapted, as in the first described embodiment, to connect the source of lubricant under pressure alternatively to the opposite ends of the bore 186 for the spool valve 188, and to connect the other end of said bore to a bearing to be lubricated, through passageways 190 or 191.

Figure 13:
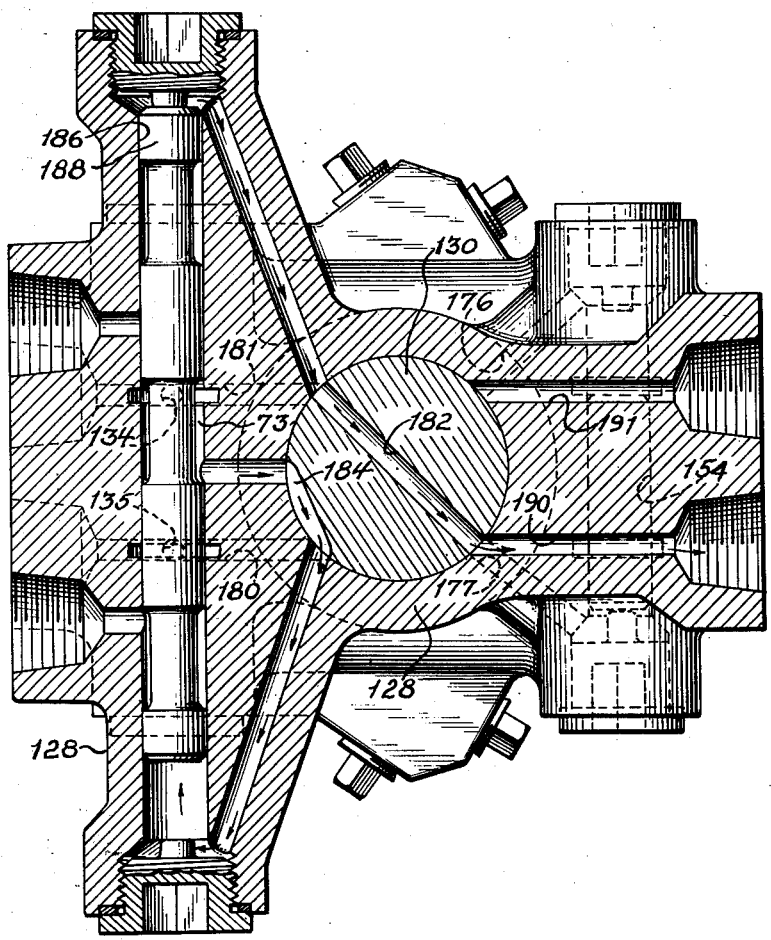
Fig. 13 is a transverse sectional view taken on the line 13—13 of Fig. 9.
Figure 14:
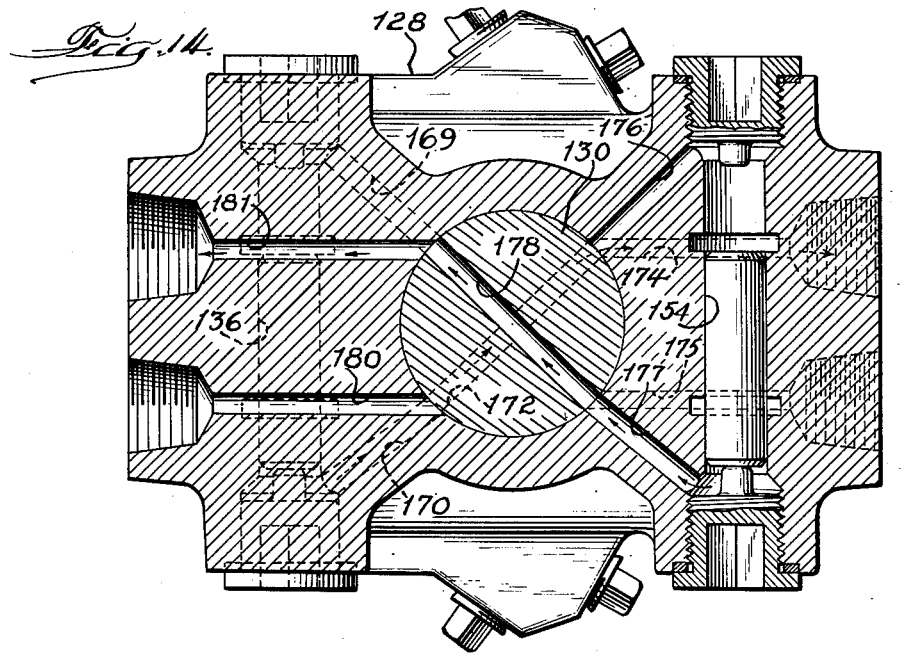
Fig. 14 is a transverse sectional view taken on the line 14—14 of Fig. 9, and is identical with a section taken on the line 14a—14a of Fig. 9.

With the spool valve in the position shown in Fig. 13, lubricant supplied through the inlet 132 will flow past the groove 73 of the spool valve and passageway 134 into the left-hand end of cylinder 136 (Fig. 10), thereby forcing the plunger 138 in said cylinder to the right, to the position in which it is shown. After the plunger 138 passes the end of the diagonal passageway 140, lubricant will flow through the latter passageway into the left-hand end of cylinder 142, and thus force the plunger in said cylinder to the right. As the plungers 138 move to the right, the lubricant charges in the right-hand ends of their respective cylinders will be forced to their respective bearings through the passageways 170, 172, and 174 (Fig. 15). After the lower plunger 138 has moved to the end of its stroke, it uncovers the end of passageway 146 (Fig. 10), which permits the lubricant to flow into this passageway and thence through passageways 147 and 176 to the right-hand (Fig. 11) end of cylinder 150, to cause its plunger to eject a measured charge of lubricant to its associated bearing, and thereafter uncover the lower end of the passageway 152, whereby lubricant is supplied to the cylinder 154.

As the plunger in the latter cylinder approaches the end of its stroke, it uncovers the lower end of passageway 156, thereby permitting lubricant to flow to the right-hand (Fig. 11) end of the rack plunger bore 158. The lubricant pressure exerted upon this plunger forces the latter to move to the left (Fig. 11) and thereby rotate the valve plug 130 clockwise (Fig. 13) through an angle of approximately 90°. Such clockwise rotation of the valve plug reverses the connections to the ends of the spool valve bore 186, so that the latter is moved to the right-hand end (Fig. 10) of its stroke. As the rack plunger 159 moves in the manner described, lubricant is discharged from the opposite end of its bore 158 through passageway 192 (Fig. 12), and around a groove in the spool valve 188, to a discharge port 194 leading to a bearing to be lubricated. A similar passageway 193 and discharge port 195 are provided for supplying lubricant from the opposite end of the bore 158 to another bearing.

After the valve plug 130 is thus moved clockwise a quarter turn from the position in which it is shown in the drawings, and the spool valve 188 is moved to the end of its stroke opposite that shown in Figs. 10 and 13, lubricant will be supplied to the cylinder 136 through the passageway 135; and after the plunger 138 in this cylinder has moved to the left (Fig. 10) substantially to the end of its stroke, lubricant will be supplied through the diagonal passageway 141 to the right-hand end of the cylinder 142. As the plunger in the cylinder 142 nears the end of its leftward stroke (Fig. 10), it will uncover the end of the passageway 160 and lubricant will thus flow through this passageway and connected passageways 161 and 177 (Fig. 16), to the left-hand end (Fig. 11) of the cylinder 150, and after it has operated the plunger therein, the lubricant may flow through the diagonal passageway 153 to the left-hand end of the cylinder 154, to operate the plunger therein. After this plunger has substantially reached the end of its stroke, the end of the passageway 157 is uncovered to permit lubricant to flow into the left-hand end of the bore 158 for the rack plunger to move the latter to the right, and thereby turn the valve plug 130 counter-clockwise to its assumed original position. A cycle of operation of the apparatus is thus completed.

It will be noted that in the embodiment of Figs. 9 to 16, as well as in the embodiment of Figs. 1 to 8, the spool valve 188, as well as the rack plunger, also serve as charge measuring plungers so that in the apparatus shown in Figs. 9 to 16, a total of twelve bearings may be supplied with individually measured charges of lubricant. It will also be noted that in the construction of Figs. 9 to 16, each plunger must substantially complete its operating stroke before lubricant may be supplied to operate the next plunger of the series. The system may thus be described as a series or progressive system, as these terms are customarily used in the art.

In both embodiments, it is necessary merely to supply lubricant to the inlet of the apparatus, whereupon a complete operating cycle will ensue.

While I have shown and described particular embodiments of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. In a centralized lubricating apparatus, the combination of a spool valve, a rack plunger, a plurality of measuring pistons, and a valve plug, a body having outlet ports and bores respectively for said valves, plunger, pistons, and valve plug; means controlled by said spool valve to conduct lubricant to one end of each of said measuring piston bores when in one position and to convey lubricant to the opposite ends of said bores when in another position, a plurality of passageways formed in part in said body and in part in said valve plug to control the supply and discharge of lubricant to and from the opposite ends of said spool valve bore, passageways in said valve plug for connecting adjacent ends of said measuring cylinders to some of said outlet ports when in one position and connecting the opposite ends of said measuring cylinders to other of said outlet ports when in a different position, means for conducting lubricant under pressure to one end of said rack plunger bore after all of said pistons have been operated in one direction, thereby to rotate said valve plug and reverse the connections to the ends of said spool valve bore and to connect the other ends of said measuring cylinders to their respective outlet ports, and means operable upon completion of the resulting reverse movement of said measuring pistons to cause said rack plunger to return said valve plug to its original position.

2. In an apparatus for supplying a plurality of parts with measured charges of lubricant, the combination of a body having an inlet opening, a plurality of discharge openings and a generally central bore; a valve plug seated in said bore, a directional spool valve reciprocable in a complementary bore formed in said body, passageways in the body and plug for conveying lubricant from the inlet to the opposite ends of the spool valve bore depending upon the position of the valve plug, a plurality of measuring cylinders formed in said body, passageways in said body connecting said inlet opening through said spool valve sequentially with one end of each of said measuring cylinders, passageways extending through said valve plug for conveying lubricant from the opposite ends of said measuring cylinders to bearings to be lubricated, and means including a reciprocable plunger operably connected to the plug valve and operated by the lubricant pressure after the lubricant has been ejected from each of said measuring cylinders, to rotate said valve plug and thereby to connect the other ends of said measuring cylinders respectively to parts to be supplied with lubricant.

3. In a centralized lubricating apparatus, the combination of a spool valve, a rack plunger, a plurality of measuring pistons, and a valve plug; a body having bores respectively for said spool valve, plunger, and valve plug, and measuring cylinders for said pistons; means controlled by said spool valve to conduct lubricant to one end of each of said measuring cylinders when in one position and to conduct lubricant to the opposite ends of said cylinders when in another position, a plurality of passageways formed in part in said body and in part in said valve plug to control the supply and discharge of lubricant to and from the opposite ends of said spool valve bore, a plurality of outlet ports in said body for connection to parts to be supplied with lubricant, passageways in said valve plug for connecting adjacent ends of said measuring cylinders to some of said outlet ports when the plug is in one position and connecting the opposite ends of said measuring cylinders to other outlet ports when the plug is in a different position, means for conducting lubricant under pressure to one end of said plunger bore after all of said pistons have been operated in one direction, thereby to rotate said valve plug and reverse the connections to the ends of said spool valve bore and to connect the other ends of said measuring cylinders to their respective outlet ports, and means operable upon completion of the resulting reverse movement of said measuring pistons to cause said plunger to return said valve plug to its original position.

4. The combination set forth in claim 3, in which the passageways connecting said measuring cylinders are arranged to cause progressive operation of said measuring pistons.

5. The combination set forth in claim 3, in which the ends of adjacent measuring cylinders are connected by passageways, and in which spring loaded check valves are located in said passageways, said check valves being loaded to open after the measuring piston of the preceding measuring cylinder in the series has been moved substantially to the end of its operative stroke.

6. In a centralized lubricating system, the combination of a body forming the cylinders of a series of progressively operating lubricant charge measuring valves and having an inlet connection, passageways connecting the cylinders in series, and a plurality of outlet connections, a reciprocable piston in each of the cylinders, a two-position valve plug in said body having passageways operable when asid plug is in one position to connect one end of each of said measuring valve cylinders to one of said outlets and operable when in its other position to connect the other ends of said measuring valve cylinders respectively to other outlets, lubricant pressure operated means for moving said valve plug between its two positions, and a directional valve controlled by said valve plug to connect said inlet alternately with the opposite ends of the measuring valves respectively at the beginning and end of the series.

7. In a centralized lubricating system, the combination of a unitary body containing a series of progressively operating reversible lubricant charge measuring devices each associated with two lubricant outlets and each having two inlet ports, means having a lubricant supply port for connection with a source of lubricant under pressure, each of said charge measuring devices including a cylinder and a piston reciprocable therein, passageways in the body connecting a valve port in each cylinder with the inlet port of the next cylinder of the series, the valve port being positioned so as to be uncovered by its associated piston only when the latter has been moved substantially to the end of its stroke, means operable by lubricant under pressure conducted through said lubricant supply port to cause lubricant to flow to one of said inlet ports of each of said devices in succession thereby to cause operation of said devices progressively in one direction, and means operated by lubricant pressure upon completion of the operation of the last in the series of said devices in said direction effectively to connect each of said devices to one of its outlets and disconnect it from its other outlet and to connect said supply port to the other inlet ports of said devices in succession and thereby to cause the operation of said devices in a reverse direction.

8. In a centralized lubricating system, a plurality of measuring cylinders having an outlet port at each end for connection with associated parts to be lubricated; a source of lubricant under pressure; rotary valve means common to all of said measuring cylinders and operable by lubricant pressure to connect said source with one end of each of said cylinders, to close the outlet ports at said ends of said cylinders and to connect the outlet ports at opposite ends of said cylinders to their respective bearings; pistons in said cylinders respectively operable by lubricant pressure to force lubricant from said cylinders through the outlet ports connected with their associated parts to be lubricated; and means including said rotary valve operable upon completion of the discharge of lubricant to said parts to connect the source of lubricant to the opposite ends of said cylinders, to cut off the outlet ports from said last named ends of said cylinders, and to connect the previously closed outlet ports to their associated parts to be lubricated.

9. In a centralized lubricating apparatus, a unitary assembly including a plurality of lubricant charge measuring devices each comprising a cylinder having an inlet port and an outlet port at its end A and at its end B; a lubricant supply port for connection to a source of lubricant under pressure; rotary valve means common to all of said lubricant charge measuring devices and operated by lubricant under pressure conducted through said supply port to connect the latter to the inlet ports at the ends A of said cylinders; to close the outlet ports at the ends A, and to connect the outlet ports at the ends B respectively to parts to be lubricated; pistons in said cylinders reciprocable by lubricant pressure and operable to discharge lubricant through the outlet ports at the ends B when lubricant is supplied to the inlet ports at the ends A of said cylinders; means including the rotary valve operable by lubricant pressure after said pistons have completed their operation in one direction to disconnect said lubricant supply port from said inlet ports at the ends A of said cylinders and to connect it to the inlet ports at the ends B of said cylinders; to disconnect the outlet ports at the ends B of said cylinders from their associated parts to be lubricated, and to connect the outlet ports at the ends A of said cylinders to their respective parts to be lubricated.

10. A unitary structure for supplying each of a plurality of parts to be lubricated with a measured charge of lubricant, comprising a body having a lubricant supply port for connection to a source of lubricant under pressure and a plurality of outlet ports for connection with the parts to be supplied with lubricant; a series of reversible lubricant measuring devices of the progressively operating type mounted within said body, lubricant pressure operated rotary valve means common to all of said devices for simultaneously connecting one of the discharge ports of each of said devices to one of said outlet ports and connecting the inlet at one end of the first of the series of said devices with said lubricant supply port; and means including the rotary valve operated by lubricant pressure after the last device of said series has been operated simultaneously to connect the other discharge port of each of said devices with other of said outlet ports and to connect said lubricant supply port to the inlet at the other end of the first of said series of devices.

11. In a centralized lubricating system, a group of lubricant charge measuring devices each for the supply of lubricant to a pair of outlets for connection to parts to be lubricated; each of said devices having a pair of discharge ports and operable on alternate half cycles of their operation to discharge lubricant alternately from said ports, a unitary rotary valve operable when in one position to connect one outlet port of each of said devices to one of a group of said outlets, and when in another position to connect the outlet ports at the other ends of said devices to outlets of a different group, and lubricant pressure operated means to rotate said valve alternately between its two said positions upon completion of the operation of supplying lubricant to said groups of outlets.

12. In a centralized lubricating system for supplying a plurality of parts with measured charges of lubricant, the combination of a body having a plurality of double acting lubricant charge measuring devices mounted therein, passageways in said body for conducting lubricant seriatim to said devices for causing their operation in one direction, additional passageways in said body connecting said devices seriatim for causing their operation in the opposite direction, a plurality of outlet ports in said body for connection to the parts to be supplied with measured charges of lubricant, a unitary rotary valve mechanism for alternately connecting the opposite ends of said devices respectively to one or the other group of outlet ports, means rendered effective upon the completion of the operation of the last to operate of said devices to change the position of said unitary valve mechanism, a lubricant supply port for connection to a source of lubricant under pressure, and means controlled by said unitary valve mechanism for connecting said supply port alternately with the opposite ends of the first of said series of devices.

13. In a centralized lubricating apparatus, the combination of a body having a valve plug rotatable therein, a plunger operatively connected to said plug to rotate the latter, a spool valve, a plurality of measuring cylinders, each of said cylinders having a right hand end and a left hand end, passageways offering substantial resistance to lubricant flow connecting the right hand ends of the cylinders, similar passageways connecting the left hand ends of the cylinders, means controlled by said spool valve to cause flow of lubricant under pressure successively to the right hand ends of said measuring cylinders when in one position and successively to the left hand ends of said cylinders when in another position; means for conveying lubricant to one end or the other of said spool valve depending upon the position of said valve plug, means operable upon completion of the operation of said measuring pistons in one direction to supply lubricant under pressure to one end of said plunger thereby to rotate said valve plug to a position to reverse the operating connections to said spool valve, and passageways having portions thereof extending through said valve plug for supplying lubricant from the ends of said measuring cylinders to bearings to be lubricated.

JOHN T. LEONARD.

REFERENCES CITED

The following references are of record in the file of this patent:

UNITED STATES PATENTS

| Number | Name | Date |
|---|---|---|
| 1,763,426 | Fraser | June 10, 1930 |
| 1,805,303 | Barks | May 12, 1931 |
| 1,805,609 | Wilson | May 19, 1931 |
| 1,932,976 | Lamb | Oct. 31, 1933 |
| 1,935,873 | Davis | Nov. 21, 1933 |
| 2,208,845 | Hillis | July 23, 1940 |
| 2,255,665 | Hillis | Sept. 9, 1941 |

FOREIGN PATENTS

| Number | Country | Date |
|---|---|---|
| 22,083 | Great Britain | 1897 |
| 741,283 | France | Dec. 3, 1932 |

Certificate of Correction

Patent No. 2,511,779 — June 13, 1950

JOHN T. LEONARD

It is hereby certified that errors appear in the printed specification of the above numbered patent requiring correction as follows:

Column 6, line 73, after the word "passageway" insert *156 connects the cylinder 154 to the right-hand;* column 10, line 26, for "asid" read *said;* column 12, list of references cited, under "UNITED STATES PATENTS" add the following:

| | | |
|---|---|---|
| *2,146,424* | Dirkes | Feb. 7, 1939 |
| *2,232,307* | Barker | Feb. 18, 1941 | and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*